(12) United States Patent
Greenebaum et al.

(10) Patent No.: US 10,665,141 B2
(45) Date of Patent: May 26, 2020

(54) SUPER-RESOLUTION, EXTENDED-RANGE RENDERING FOR ENHANCED SUBPIXEL GEOMETRY

(71) Applicant: Apple Inc., Cupertino, CA (US)

(72) Inventors: Kenneth I. Greenebaum, San Carlos, CA (US); Robert L. Ridenour, Menlo Park, CA (US); Marc Albrecht, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 16/196,794

(22) Filed: Nov. 20, 2018

(65) Prior Publication Data

US 2020/0105171 A1 Apr. 2, 2020

Related U.S. Application Data

(60) Provisional application No. 62/738,626, filed on Sep. 28, 2018.

(51) Int. Cl.

| G06T 3/40 | (2006.01) |
|---|---|
| G09G 3/00 | (2006.01) |
| G06T 5/00 | (2006.01) |
| G06T 7/70 | (2017.01) |

(52) U.S. Cl.
CPC ............ *G09G 3/00* (2013.01); *G06T 3/4069* (2013.01); *G06T 5/006* (2013.01); *G06T 7/70* (2017.01); *G09G 2300/0452* (2013.01); *G09G 2320/0666* (2013.01); *G09G 2320/08* (2013.01); *G09G 2340/0407* (2013.01); *G09G 2340/0457* (2013.01)

(58) Field of Classification Search
CPC ..... G06T 3/4076; G06T 3/4069; G06T 5/006; G09G 2300/0452; G09G 2320/0666; G09G 2340/0407; G09G 2340/0457
See application file for complete search history.

(56) References Cited

U.S. PATENT DOCUMENTS

| 7,932,883 | B2 | 4/2011 | Klompenhouwer | |
|---|---|---|---|---|
| 8,605,017 | B2 | 12/2013 | Brown Elliott | |
| 9,324,286 | B2 | 4/2016 | Mori | |
| 9,953,590 | B2 | 4/2018 | Ben-David | |
| 2018/0174529 | A1* | 6/2018 | de Greef | G09G 3/348 |
| 2018/0259824 | A1* | 9/2018 | Bouchard | G09G 3/344 |
| 2020/0027198 | A1* | 1/2020 | Vogels | G06F 17/10 |

* cited by examiner

*Primary Examiner* — Dennis P Joseph
(74) *Attorney, Agent, or Firm* — Blank Rome LLP

(57) ABSTRACT

Source content super-sampled to a first resolution in an extended range space is obtained. A representation of a subpixel geometry of a display panel displaying the source content is obtained. The display panel includes, for every pixel, plural subpixel elements for three or more color primaries. A native resolution of the display panel is lower than the first resolution of the source content. An optimization operation is performed based on a set mode of the display panel and the representation of the subpixel geometry to derive a global optimization for determining, for a given pixel value based on the source content, an energy distribution between the plurality of subpixel elements of a corresponding pixel of the display panel. The source content in the extended range space is converted into intermediate content in a display space based on the global optimization. The intermediate content is further optimized based on error minimization.

20 Claims, 7 Drawing Sheets

| ⁄⁄⁄ | RED SUBPIXEL ELEMENT |
| ||| | BLUE SUBPIXEL ELEMENT |
| ⊞ | GREEN SUBPIXEL ELEMENT |

| ≡ | $RED_1$ SUBPIXEL ELEMENT |
| ||| | BLUE SUBPIXEL ELEMENT |
| ⁄⁄⁄ | $GREEN_1$ SUBPIXEL ELEMENT |
| \\\ | $GREEN_2$ SUBPIXEL ELEMENT |
| ⊠ | $RED_2$ SUBPIXEL ELEMENT |
| ⋯ | WHITE SUBPIXEL ELEMENT |

SUPER-RESOLUTION, EXTENDED-RANGE RENDERING FOR ENHANCED SUBPIXEL GEOMETRY

BACKGROUND

This disclosure relates generally to achieving larger color gamut, increased dynamic range, and other improved performance characteristics on output devices by employing enhanced subpixel geometry. More particularly, this disclosure relates to rendering and optimization of source content based on a representation of the enhanced subpixel geometry and display modes.

Modern consumer electronic devices incorporate output devices to exchange information with users. An output device may be a display device such as liquid crystal display (LCD), organic light emitting diode (OLED), plasma, digital light processing (DLP), and the like. The display device usually employs some form of spatial subpixel layout with a group of subpixel elements within each pixel. Each subpixel element of the group corresponds to a primary color (e.g., red (R), green (G), blue (B), and the like). In many cases, voltage applied to the subpixel element is controlled between a lower limit and an upper limit to change colored light output from the subpixel element. Output colored lights from the subpixel elements of the group can thus be combined in varying amounts to produce a full gamut of colors described as a color-space of the display device.

Conventionally, display devices include red, green, and blue subpixel elements. The absolute colors of each of the subpixel elements, often described in the International Commission on Illumination XYZ (CIEXYZ) color-space or other absolute color-space, are referred to as the display's primaries or primary colors. By mixing variable brightness of the Red, Green, and Blue primaries, the display may produce the sensation of any color that lies within the three dimensional volume (gamut) described by the combination of the primaries in, e.g., the CIEXYZ color-space in which RGB vertices may be represented by: (0, 0, 0) for black; (0, 0, 1) for blue; (0, 1, 0) for green; (0, 1, 1) for cyan; (1, 0, 0) for red; (1, 0, 1) for magenta; (1, 1, 0) for yellow; and (1, 1, 1) for white. Rendering algorithms are also typically configured to output RGB content that can be displayed on RGB subpixel elements of display devices. However, the color-space that can be generated by conventional display devices with physically realizable RGB subpixel primaries cannot completely encompass the full gamut of human vision. In order to increase the color gamut of display devices (and/or improve other characteristics like display brightness, dynamic range, power consumption and the like), it is desirable to increase the number of subpixel primaries and/or change the structure (e.g., relative sizes) of the subpixel elements, while continuing the capability of the display devices to be addressed using conventional triplex (e.g., RGB) rendering algorithms and content.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a method includes: obtaining source content from a rendering layer, wherein the source content is super-sampled to a first resolution in an extended range space; (for example, allowing component values to exceed the conventional (0,1) range to employ both negative values, as well as values above 1.0) obtaining a representation of a subpixel geometry of a display panel for displaying the source content, wherein the display panel includes, for every pixel, a plurality of subpixel elements respectively corresponding to three or more color primaries, and wherein a native resolution of the display panel is lower than the first resolution of the source content; performing an optimization operation based on a set mode of the display panel and based on the representation of the subpixel geometry to derive a global optimization for determining, for a given pixel value based on the source content, an energy distribution between the plurality of subpixel elements of a corresponding pixel of the display panel; converting the source content in the extended range space into intermediate content in a display space based on the global optimization; and performing, for a given error function and based on the representation of the subpixel geometry of the display panel, an error minimization operation on the intermediate content associated with each of the plurality of subpixel elements of each pixel of the display panel, based on the super-sampled source content in the extended range space.

In another embodiment, the method may be embodied in computer executable program code and stored in a non-transitory storage device. In yet another embodiment, the method may be implemented on a system.

BRIEF DESCRIPTION OF THE DRAWINGS

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

DESCRIPTION

Figure 1:
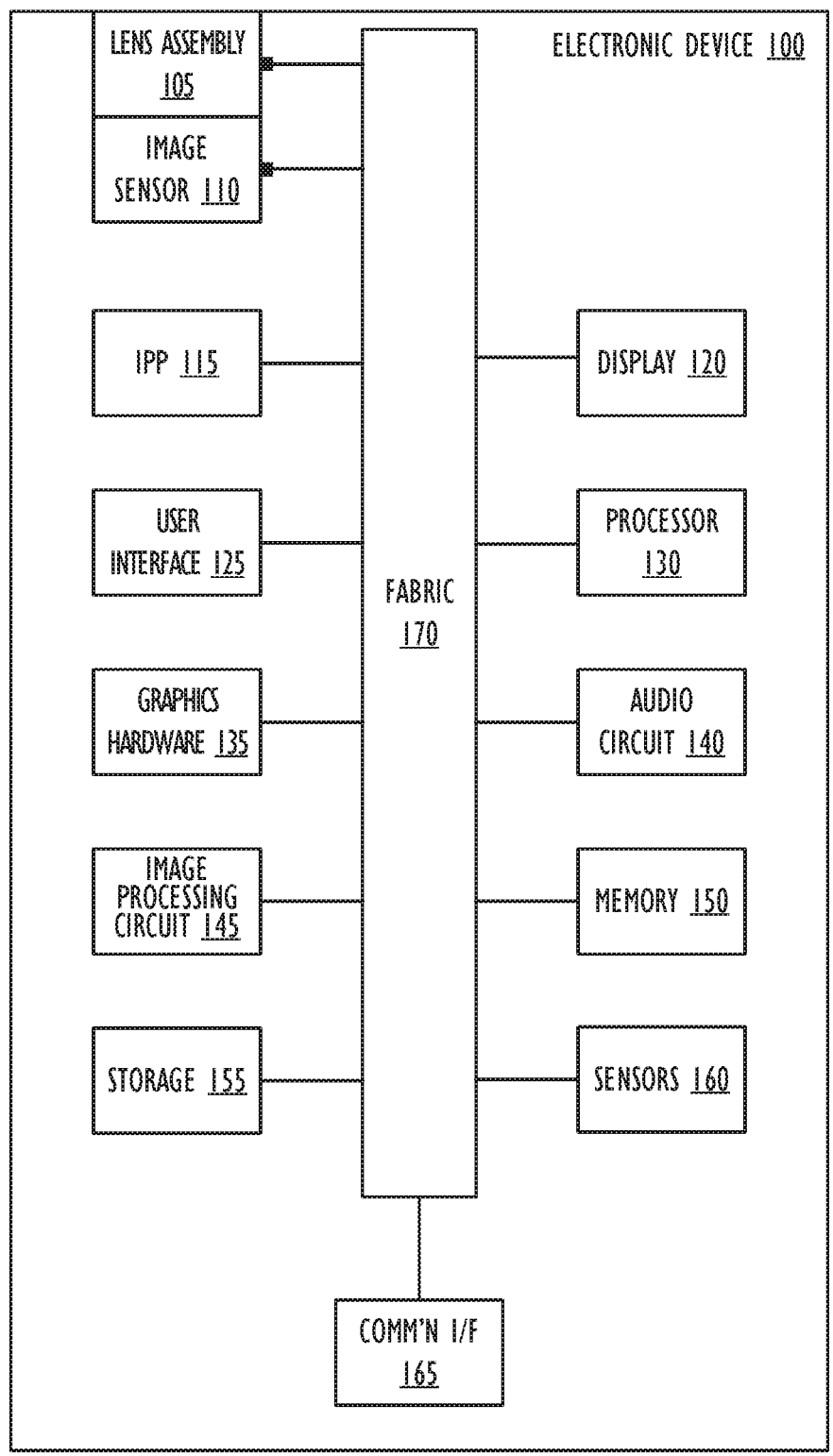
FIG. 1 shows, in block diagram form, a simplified functional block diagram of an illustrative electronic device, in accordance with one or more embodiments.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of signal processing having the benefit of this disclosure.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

This disclosure pertains to super-resolution, extended-range rendering for enhanced subpixel geometry. Techniques disclosed herein improve gamut, dynamic range, and other performance characteristics of display devices with high native display resolution (e.g., pixel addressable resolution) by employing non-standard, enhanced subpixel geometries, while not placing a burden on conventional triplex (e.g., RGB) rendering models or rendering content. Very wide gamut content representations, (e.g., rec. 2020 video) may greatly benefit with the techniques disclosed herein since they conventionally require displays to employ exotic single wavelength laser based primaries to be accurately and fully represented. Instead of employing the exotic laser primaries, by utilizing the techniques disclosed herein, the very wide gamut (of, e.g., rec. 2020) may be closely matched by using larger or more numerous (e.g., 4 or more) conventional primaries (subpixel elements). For example, an unfiltered white subpixel element may be added to RGB subpixel elements to contribute display brightness while being much more efficient than driving the RGB subpixel elements to create white. As another example, more numerous subpixel elements with different color primaries may be provided for covering a wider color gamut. As yet another example, larger and/or more numerous subpixel elements may be provided for a given color primary (e.g., blue) that is known to wear faster than other color primaries in order to improve color gamut and also to increase overall life of the display device. The system algorithm may enable standard imaging techniques and renderers (e.g., RGB renderers) to continue to be employed while optimally displaying to any enhanced subpixel geometry without requiring bespoke rendering. The system algorithm may allow standard renderers to write to the display device with the enhanced subpixel geometry without adding any complexity to the software stack running on the system. The added expense of the algorithm may be scalable with eccentricities or degree of correction desired.

In one embodiment, applications may render source content (e.g., having RGB-based color-space) using standard renderers into an extended range space to carry extended gamut and dynamic range information. The system may color match the rendered source content into an extended range space associated with a display device having the enhanced subpixel geometry (e.g., subpixel elements for greater than three color primaries, larger or more numerous subpixel elements, and the like). Applications may also render natively or super-sample the source content to a high resolution to render super-sampled, color matched source content in the extended range space associated with the display device. The super-sampled, rendered source content may be in a resolution higher than a display resolution (e.g., native resolution or pixel addressable resolution) of the display device. The system may further obtain a representation (e.g., matrix of cells) of the enhanced subpixel geometry of the display device. The subpixel geometry representation may indicate a spatial, colorimetric, spectral, performance, efficiency and/or dynamic range map of the repeating subpixel layout of the enhanced subpixel geometry. In addition, the display device may be settable to a given one of a plurality of modes based on predetermined criteria (e.g., user operation, sensor data meeting a condition, and the like). The plurality of modes may include a maximum brightness mode, a maximum gamut mode, a maximum resolution mode, a low power mode, a blue safe mode, a wear leveling mode, a colorblind mode, and the like.

Based on the current set mode and the subpixel geometry representation of the display device, the system may perform an optimization operation (e.g., matrix operation, parametric operation, and the like) using a corresponding luma equation (e.g., weighted sum) to derive a global optimization table indicating an energy distribution between subpixel elements of a given pixel of the display device for generating a given input pixel value (e.g., RGB value) in the rendered source content in the extended range space. Based on the derived global optimization, the system may convert the super-sampled, rendered source content in the extended range space into intermediate content in a display space corresponding to the enhanced subpixel geometry (e.g., via a scaling operation), yielding a spatially antialiased result. Still further, the system may utilize the extra spatial information available in the super-sampled source content in the extended range space to optimize the intermediate content associated with each subpixel element of each pixel of the display device using an error minimization (e.g., single pass or multipass error diffusion) operation based on a given error function, thereby optimizing values at the subpixel-level to achieve higher resolution and carry the extra spatial information of the super-sampled content to the display. The error minimization may be selectively enabled depending on predetermined conditions.

Referring to FIG. 1, a simplified functional block diagram of illustrative electronic device 100 capable of rendering text and other information onto an image or video sequence is shown according to one or more embodiments. Electronic device 100 could be, for example, a mobile telephone, personal media device, a notebook computer system, a tablet computer system, or a desktop computer system. As shown, electronic device 100 may include lens assembly 105 and image sensor 110 for capturing images of a scene such as a high dynamic range (HDR) video. In addition, electronic device 100 may include image processing pipeline (IPP) 115, display element 120, user interface 125, processor(s) 130, graphics hardware 135, audio circuit 140, image processing circuit 145, memory 150, storage 155, sensors 160, communication interface 165, and communication network or fabric 170.

Lens assembly 105 may include a single lens or multiple lens, filters, and a physical housing unit (e.g., a barrel). One function of lens assembly 105 is to focus light from a scene onto image sensor 110. Image sensor 110 may, for example, be a CCD (charge-coupled device) or CMOS (complementary metal-oxide semiconductor) imager. Device 100 may include more than one lens assembly and more than one image sensor. Each lens assembly may focus light onto a single image sensor (at the same or different times) or different portions of a single image sensor.

IPP 115 may process image sensor output (e.g., RAW image data from sensor 110) to yield a HDR image, image sequence or video sequence. More specifically, IPP 115 may perform a number of different tasks including, but not be limited to, black level removal, de-noising, lens shading correction, white balance adjustment, demosaicing operations, and the application of local or global tone curves or maps. IPP 115 may also perform super-sampling, global optimization, and error minimization operations according to one or more embodiments. IPP 115 may comprise a custom designed integrated circuit, a programmable gate-array, a central processing unit (CPU), a graphical processing unit (GPU), memory or a combination of these elements (including more than one of any given element; non-transitory program storage device; programmable control device). Some functions provided by IPP 115 may be implemented at least in part via software (including firmware).

Display element (e.g., display device, display panel, or display) 120 may be a wide gamut display and may be used to display text and graphic output as well as receiving user input via user interface 125. User interface 125 can also take a variety of other forms such as a button, keypad, dial, a click wheel, and keyboard. For example, display element 120 may be a touch-sensitive display screen. Display element 120 may be based on any display technology like LCD, OLED, plasma, DLP, quantum dots, and the like.

Display 120 may have enhanced subpixel geometry. The term "enhanced subpixel geometry," used throughout this disclosure, refers to any repeating (or non-repeating) subpixel geometry other than the standard repeating subpixel layout of stripes of RGB subpixel elements. For example, one or more additional subpixel elements (e.g., white subpixel element, or one or more subpixel elements of one or more other colors) may be added to RGB subpixel elements. As another example, larger (bigger spatial dimension) or more numerous subpixel elements may be provided for one or more color primaries (e.g., blue). Yet another example of enhanced subpixel geometry can be an alternating arrangement of subpixel element stripes across rows or columns of pixels (e.g., RGB-BGR subpixel elements in alternating rows). Non-limiting examples of enhanced subpixel geometries that display element 120 may have are shown in FIGS. 2A-2B.

Figure 2A:
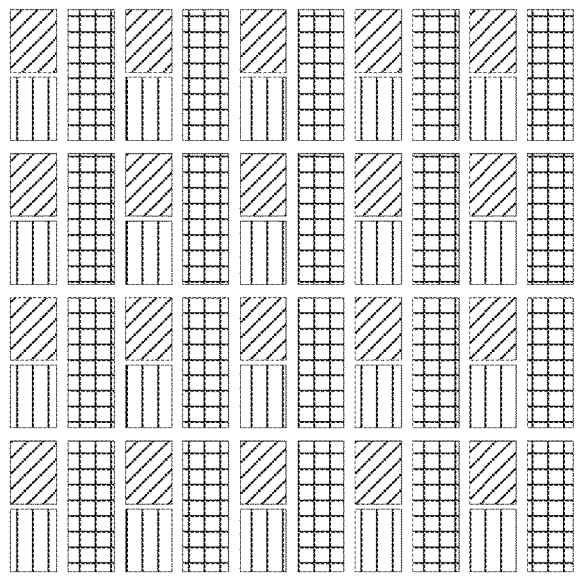
FIGS. 2A-2B illustrate exemplary enhanced subpixel geometry layouts, in accordance with one or more embodiments.
Figure 2B:
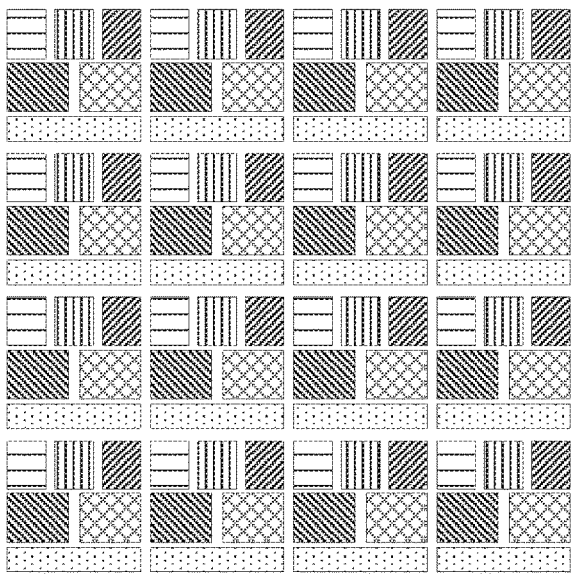

As shown in FIG. 2A, display element 120 may have enhanced subpixel geometry 200A of repeating RGB subpixel elements in which the size of the green subpixel element is increased. Further, as shown in FIG. 2B, display element 120 may have enhanced subpixel geometry 200B in which six subpixel elements for six color primaries are provided for each pixel (e.g., $R_1$, $R_2$, $G_1$, $G_2$, B, and W). Color primaries of the subpixel elements are not limiting and could be any of green subpixel elements, blue subpixel elements, cyan subpixel elements, magenta subpixel elements, yellow subpixel elements, white subpixel elements, or other colors. The enhanced subpixel geometry may be employed to improve display characteristics of display element 120. The display characteristics that may be improved include a wider gamut of colors that can be reproduced by display element 120, an increased dynamic range, improved power characteristics, improved efficiency, and the like. Although FIGS. 2A-2B illustrate subpixel geometries having repeating subpixel layouts, subpixel geometry of display 120 may also be enhanced by having a non-repeating subpixel layout (e.g., different subpixel element layout for different pixels of display 120), as long as a map (e.g., subpixel geometry map 446 in FIG. 4) is provided of the actual subpixel layout for an optimizer (e.g., optimization operation module 442) to reference.

Figure 3:
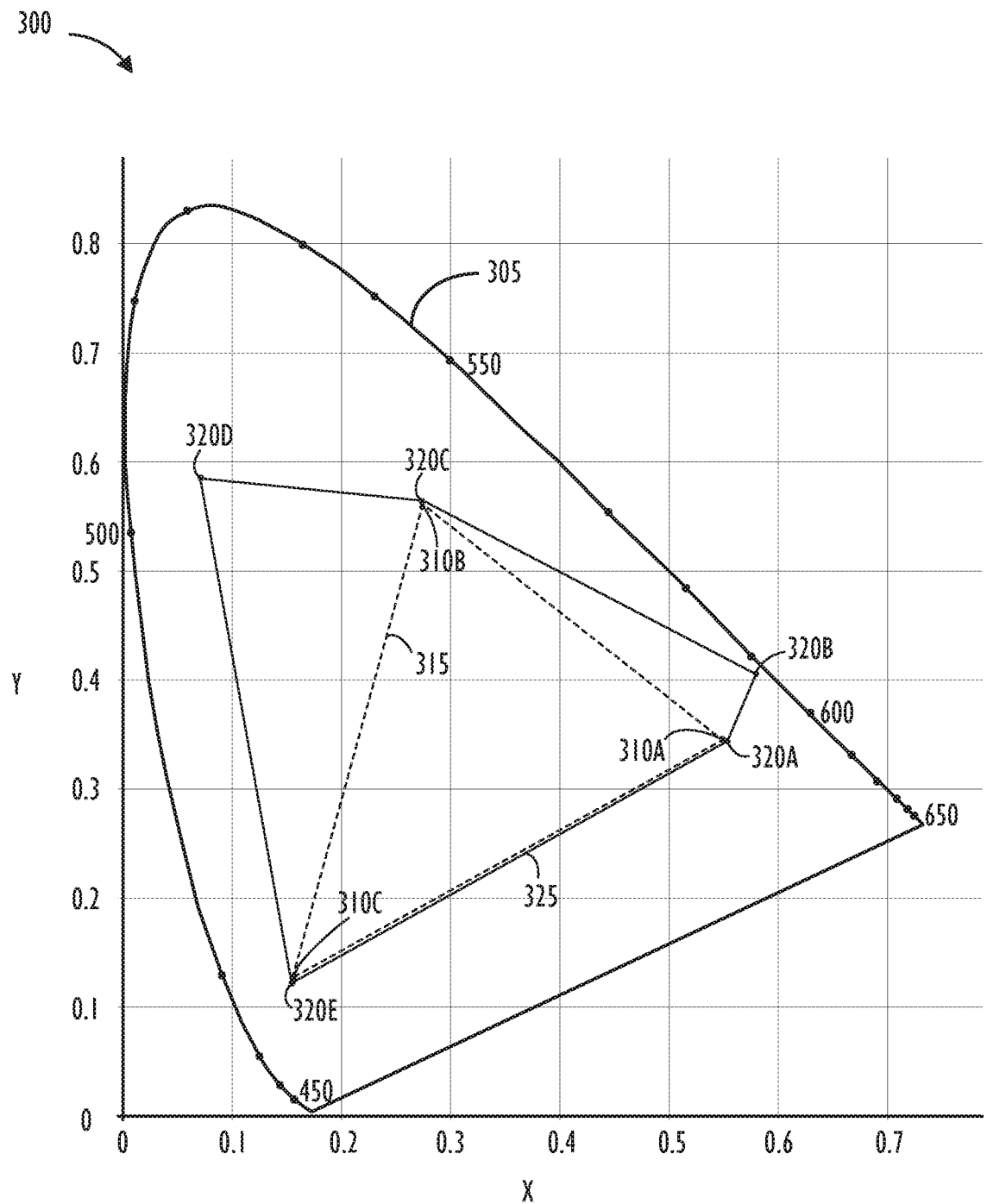
FIG. 3 illustrates the International Commission on Illumination (CIE) 1931 color-space chromaticity diagram showing an exemplary gamut achieved with an enhanced subpixel geometry display, in accordance with one or more embodiments.

An illustration of a wider gamut that can be achieved by employing the enhanced subpixel geometry for display element 120 is shown with reference to FIG. 3. FIG. 3 illustrates a two dimensional projection of a three dimensional color gamut (of, e.g., CIEXYZ) previously mentioned. As shown in FIG. 3, the CIE 1931 color-space chromaticity diagram 300 shows an exemplary wide gamut 325 achieved by display element 120 with the enhanced subpixel geometry, in accordance with one or more embodiments. In FIG. 3, outer curved boundary 305 represents the human visible spectrum of monochromatic colors with wavelengths indicated in nanometers (e.g., 450, 500, 550, 600, and 650 nm). The colors along outer curved boundary 305 progress through a range of purple, blue, green, yellow, orange, and red with increasing wavelength.

In the context of this human visible spectrum of monochromatic colors, a display device having the conventional, standard RGB subpixel geometry may have a particular RGB color-space (e.g., sRGB color-space) defined by chromaticities of the red, green, and blue color primaries (e.g., the chromaticity where one color channel has a nonzero value and the other two channels have zero values) that form the vertices of color triangle 315. The gamut of chromaticities that can be represented by an RGB color-space are represented by the chromaticities that are within color triangle 315. Color triangle 315 corresponds to the sRGB color-space, the most common of the RGB color-spaces. Vertex 310A is the sRGB red primary, vertex 310B is the sRGB green primary, and vertex 310C is the sRGB blue primary. As is clear from FIG. 3, a significant portion of the human visible spectrum is outside the color-space that can be achieved by a display device having the conventional, standard RGB subpixel geometry with red, green, and blue color primaries corresponding to vertices 310A-C. Further, as is evident from the exemplary wide gamut 325 shown in FIG. 3, a wider portion of the human visible spectrum may be covered by increasing the number of subpixel primaries to be greater than 3.

For example, as shown in FIG. 3, the enhanced subpixel geometry of display element 120 may include five subpixel elements per pixel that respectively produce color primaries corresponding to vertices 320A-E to achieve a wide gamut color-space. Chromaticities of the five color primaries 320A-E (e.g., $R_1$, $R_2$, $G_1$, $G_2$, and B) are along curved boundary 305 and form vertices of element 325. The number of subpixel elements is not limiting and more or less subpixel elements may be employed. As is evident from FIG. 3, the subpixel color primaries 320A-E may be employed to have colors as close to the locus of human vision 305 as possible, to enable a display that may cover as many colors perceivable by a human as possible. The gamut of chromaticities that can be represented by the wide gamut color-space 325 are represented by the chromaticities that are within element 325. By employing additional subpixel color primaries (e.g., 320B, and 320D), an expressible gamut 325 larger than the triangular gamut 315 expressible by three unique primaries (e.g., standard RGB color primaries) can be achieved. Not only may the wider gamut be able to generate more saturated colors than possible with three color primary displays, but also the extra subpixel primaries may be employed to re-saturate colors that have been "washed out" by ambient environment (e.g., outdoors), light leakage, use of white subpixel elements, and the like.

Returning to FIG. 1, processor 130 may be a system-on-chip (SOC) such as those found in mobile devices and include one or more dedicated CPUs and one or more GPUs. Processor 130 may be based on reduced instruction-set computer (RISC) or complex instruction-set computer (CISC) architectures or any other suitable architecture and each computing unit may include one or more processing cores. Graphics hardware 135 may be special purpose computational hardware for processing graphics and/or assisting processor 130 perform computational tasks. In one embodiment, graphics hardware 135 may include one or more programmable GPUs each of which may have one or more cores. Audio circuit 140 may include one or more microphones, one or more speakers and one or more audio codecs. Image processing circuit 145 may aid in the capture of still and video images from image sensor 110 and include at least one video codec. Image processing circuit 145 may work in concert with IPP 115, processor 130 and/or graphics hardware 135.

Images, once captured, may be stored in memory 150 and/or storage 155. Memory 150 may include one or more different types of media used by IPP 115, processor 130, graphics hardware 135, audio circuit 140, and image processing circuitry 145 to perform device functions. For example, memory 150 may include memory cache, read-only memory (ROM), and/or random access memory (RAM). Storage 155 may store media (e.g., audio, image and video files), computer program instructions or software, preference information, device profile information, and any other suitable data. Storage 155 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM).

Device sensors 160 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor sensor, an electrostatic sensor, a temperature sensor, a heat sensor, a thermometer, a light sensor, a differential light sensor, an opacity sensor, a scattering light sensor, a diffractional sensor, a refraction sensor, a reflection sensor, a polarization sensor, a phase sensor, a florescence sensor, a phosphorescence sensor, a pixel array, a micro pixel array, a rotation sensor, a velocity sensor, an inclinometer, a pyranometer and a momentum sensor.

Communication interface 165 may be used to connect device 100 to one or more networks. Illustrative networks include, but are not limited to, a local network such as a universal serial bus (USB) network, an organization's local area network, and a wide area network such as the Internet. Communication interface 165 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). Communication network or fabric 170 may be comprised of one or more continuous (as shown) or discontinuous communication links and be formed as a bus network, a communication network, or a fabric comprised of one or more switching devices (e.g., a cross-bar switch). In general, one or more of processor 130, graphics hardware 135 and image processing circuit 145 may be configured to render selected information (textual or graphic) in a designated or specified region within an image or frame.

Figure 4:
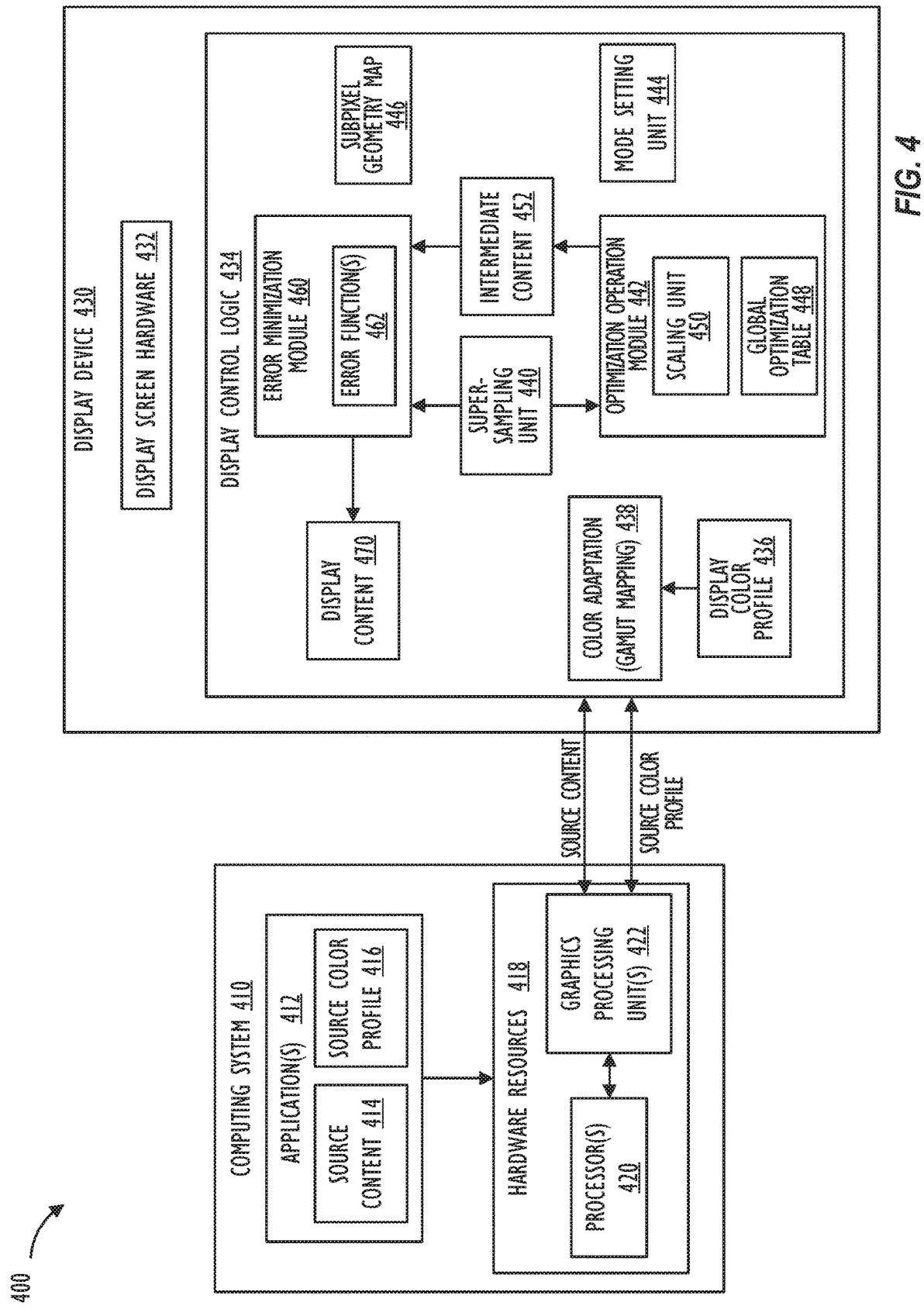
FIG. 4 shows a system architecture for performing content rendering on enhanced subpixel geometry displays, in accordance with one or more embodiments.

FIG. 4 shows computing system architecture 400 for performing content rendering on enhanced subpixel geometry display device 430, without a renderer requiring knowledge of the specific characteristics of display device 430 such as the specific number of subpixel elements, subpixel colorimetry, subpixel efficiency, subpixel wear leveling requirements, or subpixel geometry, in accordance with one or more embodiments. Using FIG. 1 as an example, system architecture 400 may be implemented using electronic device 100 via one or more of IPP 115, graphics hardware 135, image processing circuit 145, storage 155, memory 150, processor 130, and display 120. Without the benefit of computing system architecture 400 of FIG. 4, applications rendering content onto a display device with enhanced subpixel geometry would have to employ bespoke image processing and rendering algorithms that are based on the specific characteristics (e.g., spatial, colorimetric, spectral, performance, efficiency and/or dynamic range characteristics) of the enhanced subpixel geometry. Instead of requiring such bespoke rendering by source content authors, system architecture 400 provides a mechanism that hides the added complexity from the software stack, and enables "standard" image processing and rendering algorithms to continue to be employed to write content onto display device 430 with the enhanced subpixel geometry. That is, applications may continue to render content into typical 3-channel variant RGB color-spaces, or luminance-color-spaces, without having to render content into specific display spaces that are specific to the enhanced subpixel geometry employed by display device 430.

FIG. 4 illustrates that computing system architecture 400 encompasses computing system 410 and display device 430. Computing system 410 and display device 430 can be implemented as separate devices that connect together using a wireless connection and/or externally wired connection that include, but is not limited to, a video graphics array (VGA) connection, a digital visual interface (DVI) connection, a high-definition multimedia interface (HDMI) connection, and/or a DisplayPort connection. In another embodiment, display device 430 may be embedded and internally connected to computing system 410. Examples of embedded display devices 430 include, but are not limited to, display screens installed within mobile devices, tablet computer systems, smart phones, laptop computer systems, and other portable electronic devices.

Element 412 represents one or more applications running on computing system 410. Applications 412 may act as source content authors that creates source content 414 that a viewer of display device 430 wishes to view. Source content 414 may comprise an image, video, or other displayable (e.g., computer-generated) content type. Element 416 represents a source color profile (e.g., an International Color Consortium (ICC) profile of the source content author's device or color-space, or other related information), that is, information describing the color profile and display characteristics of the device on which source content 414 was authored by the source content author. For example, ICC source color profile 416 attached to source content 414 by source content's 414 author specifies source content's 414 "rendering intent."

To display source content 414 on the display device 430 based on source color profile 416, applications 412 may call and provide source content 414 to hardware resources 418 for rendering. Although not specifically shown, applications 412 may utilize one or more application program interfaces (APIs) to interface with the hardware resources 418, one or more graphics framework layers, and/or operating system (O/S) services. As an example, applications 412 may issue a draw call and provide the source content 414, and source color profile 416, to the hardware resources 418 via an API. Hardware resources 418 (e.g., GPUs 422) may subsequently provide rendered source content 414, source color profile 416, and/or other image information to the display device 430 for output.

Examples of a color-space associated with source color profile 416 may include, but are not limited to, variant RGB color-spaces (e.g., sRGB color-space), variant CMYK color-space, and luminance-color-spaces, such as YCrCb. Each type of color-space may have multiple color channels, where each color channel represents a color or characteristic (e.g., luminance or brightness) of the color-space. As an example, an RGB color-space can be divided into three color channels (e.g., red, green, and blue color channels). Meanwhile, a CMYK color-space may be divided into four different color channels (e.g., cyan, magenta, yellow, and black).

FIG. 4 further illustrates that hardware resources 418 may include one or more processors 420 and one or more graphics processing units (GPUs) 422 to render source content 414. Processors 420 may be implemented using one or more central processing units (CPUs), where each CPU may contain one or more processing cores and/or memory components that function as buffers and/or data storage (e.g., cache memory). The processors 420 may also be part of or are coupled to one or more other processing components, such as application specific integrated circuits (ASICs), field-programmable gate arrays (FPGAs), and/or digital signal processors (DSPs). Hardware resources 418 may be able to utilize processors 420, GPUs 422, or simultaneously use both the GPUs 422 and processors 420 to render source content 414. Although not explicitly shown in FIG. 4, hardware resources 418 may include other types of hardware resources (e.g., memory) known by persons of ordinary skill in the art for rendering source content 414. Information relating to source content 414 and source color profile 416 may be sent to display device 430 for processing and display.

In one embodiment, the color-space associated with source color profile 416 and rendered source content 414 may be an extended range color-space which may carry extra information in values outside a nominal range of 0.0-1.0. The nominal range of 0.0-1.0 may correspond to a base range space (e.g., variant RGB space, luminance-color-space, and the like) where each image element of source content is defined by reference values in a first range. In the extended range space, each image element of the source content may be defined by reference values in a second range that encompasses the first range.

More specifically, the base range space may describe source content (e.g., a rendered image) in terms of reference values that define properties of image pixels. For example, each pixel of an image expressed in an RGB format may include reference values for a red channel, a green channel, and a blue channel. Collectively, the reference values for the red, green, and blue channels define the properties of the pixel within a given color-space (i.e., a color-space defined by the red, green, and blue channel primaries). The reference values may be described in terms of nominal values that range from 0.0 to 1.0. For example, an image pixel having a value of (1.0, 0.0, 0.0) (expressed as (R, G, B)), would be a pure red pixel with the highest possible brightness (i.e., a pixel having the properties of the red channel primary) in the base range space. In one embodiment, the extended range space may be consistent with the base range space over the range of reference values (i.e., 0.0-1.0) of the base range space. Therefore, the extended range space references the same primaries as the base range space (e.g., Red, Green, and Blue). However, the nominal range for reference values may be extended (e.g., from 0.0-1.0 to −0.75-1.25) to encode additional image data (i.e., image data that cannot be represented using the base range space such as, for example, extended gamut, extended dynamic range, and extended precision). Thus, the extended nominal range of the extended range space may be utilized to encode increased brightness and a wider color gamut than can be represented using the base (i.e., 0.0-1.0) range space. For example, in the extended nominal range, values above one may offer more head-room and antagonistic, negative values may represent values that are more saturated and may fall out of a matrixing map depending on available gamut and dynamic range in the system.

In one embodiment, the extended range color-space may be a device-independent color-space that define colors independent of the devices that create or output source content 414. Often times, device-independent color-spaces exceed the color ranges or gamut of device-dependent color-spaces. As an example, the CIE L*a*b* (CIELAB) color-space may include both the color ranges of a particular RGB color-space and CMYK color-space. Persons of ordinary skill in the art are aware that L*, a*, and b* represent absolute values that have pre-defined ranges. Other types of device-independent color-spaces may also be used, such as the CIE XYZ (CIEXYZ) color-space. The extended range space need not necessarily be a device-independent color-space or a wide gamut color-space. For example, the extended range space may describe the sRGB color-space to build a greater-than-three-primary, more efficient, sRGB display.

As further shown in FIG. 4, the display device 430 includes display control logic 434 and display screen hardware 432 for displaying source content 414. Display screen hardware 432 represents a display device screen (e.g., display 120, display 710 of FIG. 7) with the enhanced subpixel geometry of repeating subpixel blocks as previously described. Display screen hardware 432 may include a light source and a diffuser to illuminate one or more images on the display device screen. The design and implementation of display screen hardware 432 may differ depending on the type of display device. Non-limiting examples of display device types include liquid crystal displays, plasma displays, quantum dot-based display and light emitting diode displays (e.g., organic light emitting diode displays). In one or more embodiments, display screen hardware 432 may be calibrated (e.g., factory calibration) for adjusting gamma, white point, black point, gray tracking, and the like.

Display control logic 434 may include components for performing color management tasks designed to maintain the appearance of colors of source content 414 (i.e., rendering intent) when reproduced on display device 430. Further, display control logic 434 may also include components for adjusting output settings of display screen hardware 432 based on display device 430 modes, calibration data, optimization values, and error minimization processes. Upon receiving source content 414 and source color profile 416, display control logic 434 may perform color adaptation process 438 on the received data for performing gamut mapping, or color matching across various color-spaces, based on device color profile 436. For example, gamut matching tries to preserve (as closely as possible) the relative relationships between colors, even if all the colors must be systematically distorted in order to get them to display on display screen hardware 432.

Display control logic 434 may include one or more processors and/or other type of system on chip (SoC) components to process rendered source content 414. As an example, display control logic 434 may include processing components, such as ASICs, FPGAs, DSPs, and memory for performing color management tasks like color-space conversions, and other tasks like controlling to super-sample source content 414, setting optimizations based on modes of display device 430, error minimization for achieving subpixel antialiasing and higher spatial resolution, and/or to instruct display screen hardware 432 to display the rendered source content. In one or more embodiments, display control logic 434 may act as a smart display that is able to perform one or more functions processors 420 and/or GPUs 422 generally perform. Stated another way, depending on display control logic's 434 processing capability and/or computing resources, computing system 410 may offload one or more rendering tasks to display control logic 434 via a connection (e.g., a Universal Serial Bus-C connection). As shown in FIG. 4, display control logic 434 may include display color profile 436, color adaptation 438, super-sampling unit 440, optimization operation module 442, mode setting unit 444, subpixel geometry map 446, intermediate content 452, error minimization module 460, and display content 470.

Color management tasks like color-space conversion may involve performing one or more translation operations to convert source color profile 416 to device color profile 436. For example, source color profile 416 may be a standard RGB color profile (e.g., sRGB color profile), but display device 430 may be configured with a wide gamut Digital Cinema Initiatives (DCI)-P3 or ProPhoto RGB color profile as device color profile 436. Further, device color profile 436 may be synchronized to match and maintain compatibility with the display screen hardware 432.

The one or more translation operations may also operate on extended range color-spaces when converting between color profiles to preserve the extended range information or values of rendered source content 414. The one or more translation operations may also involve the device-independent color-space (e.g., a generic profile connection space), as an intermediate color-space.

When display control logic 434 receives the rendered source content 414 and source color profile 416 (including information regarding an extended range space the source content is rendered into), display control logic 434 performs one or more color-space conversions (color adaptation 438) to color match source color profile 416 to device color profile 436 and generate content in a color-space (e.g., an extended range space) associated with device color profile 436 in real-time.

Further, as shown in FIG. 4, super-sampling unit 440 may cause source content (in the extended range space) to be rendered at a higher resolution higher by a factor of N (super-resolution) than a display resolution (e.g., native display resolution) of display screen hardware 432 for spatial antialiasing. In one embodiment, the factor N may be determined based on the subpixel geometry as captured in subpixel geometry map 446. As a non-limiting example, rendered source content rendered at 64×64 pixels in the extended range space may be rendered at 256×256 to achieve 16× super-sampling. In one embodiment, super-sampling unit 440 may cause computing system 410 (or another computing device) to re-render source content 414 at a resolution that is higher than the native display resolution of display screen hardware 432 by the predetermined factor N (e.g., 4×, 16×, and the like). This causes source content author (e.g., applications 412) to take N color samples at several instances inside each rendered pixel using known super-sampling techniques to re-render source content as super-sampled source content that includes extra spatial information and resolution.

In one embodiment, super-sampling unit 440 obtains from subpixel geometry map 446, a representation of the enhanced subpixel geometry of display screen hardware 432 to set the predetermined factor N so that eccentricities of the enhanced subpixel geometry of display screen hardware 432 may be fully encompassed by the super-sampled source content. Based on the set predetermined factor N, super-sampling unit 440 may cause computing system 410 to adaptively render to a super-sampled representation (e.g., RGB) scaled up from the nominal. Further, since the super-sampled representation may fully convey the rendering intent of the source content author (e.g., how skinny font elements are intended to be, which edges are intended to be sharp, which gradient is intended to be smooth, and the like), higher resolution with spatial antialiasing may be achieved by potentially carrying the generated extra spatial information via subpixel rendering to subpixel elements of display screen hardware 432. As explained above with respect to rendered source content 414, the super-sampled, high resolution source content may also be color matched into the extended range space associated with device color profile 436. The super-sampled, high resolution source content may be provided as input to optimization operation module 442.

Subpixel geometry map 446 may be a map of the (repeating or non-repeating) enhanced subpixel element layout of display screen hardware 432 that conveys spatial, colorimetric, spectral, performance, efficiency, and/or dynamic range information for each subpixel element of the repeating layout. In one embodiment, subpixel geometry map 446 may be represented by a matrix of cells having sufficient predetermined resolution to capture the enhanced subpixel geometry of display screen hardware 432. The matrix can then be transformed depending on the mode of display device 430 to achieve a global solution (global optimization) for driving display screen hardware 432.

Alternately, subpixel geometry map 446 may be represented in a table, math function, analytical model, and the like. Subpixel geometry map 446 may be represented in any format as long as it provides an accurate description of the subpixel array (repeating subpixel block). In one embodiment, information provided by subpixel geometry map 446 may account for the orientation of display screen hardware 432 relative to the rendered source content. That is, information provided by subpixel geometry map 446 may change if display screen hardware 432 is rotated from one orientation to another (e.g., portrait to landscape orientation).

The subpixel geometry map 446 may also convey additional information per subpixel element of the repeating layout. For example, if display screen hardware 432 is an OLED-based device, the additional information may include information on a per subpixel element basis regarding power consumption, efficiency, half-life, subpixel element spectral characteristics, and representation of the subpixel element in the CIEXYZ color-space. If display screen hardware 432 is a subtractive-filter (e.g., LCD) based device, the additional information may include information on a per subpixel element basis regarding emissivity, efficiency, and representation of the subpixel element in the CIEXYZ color-space.

Mode setting unit 444 may set display device 430 into one of a plurality of modes based on user operation of selecting a particular mode (or automatically based on data from sensors (e.g., sensors 160)). Optimization operation module 442 may adjust output settings of display screen hardware 432 based on the mode in which display device 430 is set my mode setting unit 444. Non-limiting examples of the plurality of modes may include a maximum brightness mode, a maximum gamut mode, a maximum resolution mode, a low power mode, a blue safe mode, a wear leveling mode, a colorblind mode, and the like.

In the maximum brightness mode, a perceptual model may suggest based on sensor data that a user is adapted to a bright ambient environment (e.g., outdoors), thereby requiring generation of as much display light as possible. As a result, in the maximum brightness mode, display control logic 434 may control to engage all contributing subpixel elements based on display data to produce as much light as possible. In the maximum gamut mode, display control logic 434 may control to represent as much fidelity and gamut as possible by employing subpixel elements in the group of subpixel elements that are wider gamut than the color indicated based on the rendering intent of source content 414. That is, display control logic 434 may control to engage only those subpixel elements (based on display data) that won't limit color gamut. For example, if the enhanced subpixel geometry includes respective subpixel elements for two different shades of blue and if the color indicated based on the rendering intent of source content 414 is a less saturated blue that is closer to white, then display control logic 434 may, in the maximum gamut mode, control to employ both blue subpixel elements and then determine the appropriate mix of incorporated antagonistic colors to get to the color indicated by the rendering intent (or as close to the rendering intent color if the rendering intent color is outside of the displayable gamut).

In the maximum resolution mode, display control logic 434 may control to optimize for subpixel element spatial correctness. In the low power mode, if display screen hardware 432 is an OLED-based device, and if the enhanced subpixel geometry includes a subpixel element for unfiltered, bright/high efficiency white, then display control logic 434 may, in the low power mode, control to solve the corresponding luma equation (e.g., weighted sum) to first determine for a given source content pixel value, the corresponding white subpixel element value (e.g., voltage value, energy value) by subtracting off as the white component, the lowest component pixel value from source content's extended range subpixel values (resulting in the nominal value of one of the residual extended range subpixel values of source content to become 0), apply the white component to the white subpixel element, and apply the residual component to respective red, green, and blue subpixel elements. Since applying the white component to the white subpixel element is far more efficient than driving each of the red, green, and blue subpixel elements to produce white, power consumption can be drastically improved when display device 430 is in low power mode.

More specifically, given a desired RGB pixel value, display control logic 434 may calculate the white component in the low power mode for OLED-based devices as the minimum of the RGB component values. Thus, the white component (R=G=B) minimum value may be subtracted from the desired RGB pixel value, leaving a residual color to be driven by the potentially less efficient color subpixels elements. For example, for (1.0, 0.25, 0.10) RGB, the common white would be (0.10, 0.10, 0.10), with residual color (0.9, 0.15, 0.0). Similarly, on LCD displays, an unfiltered white subpixel element has much higher emissive efficiency (i.e., given the same backlight, this white subpixel element is far brighter than white made up of the R, G, B subpixel elements given the same area). In the low power mode, by using a variation of the above described technique, display control logic 434 may similarly employ white subpixel elements (and potentially also employ colored subpixel elements in parallel to drive not only color but also increase white brightness), thereby enabling the display to provide much brighter whites (and unsaturated colors) than would otherwise be possible. This would be especially beneficial for HDR content since specular highlights are often the brightest elements, and being reflections of the scene illumination, they are mostly shades of whites, or in low power or higher brightness modes where brightness is more important than saturation.

In the blue safe mode, wherein it is felt short wavelength (e.g., long wavelength blue, short wavelength blue) light might affect sleep or health, display control logic 434 may control to minimize use of a blue subpixel element. For example, if the enhanced subpixel geometry includes respective subpixel elements for two different shades of blue (e.g., long blue, and short blue), then display control logic 434 may control to avoid use of the short blue subpixel element and then determine the appropriate mix the remaining subpixel element colors to get to the rendering intent color (or as close to the rendering intent color if the rendering intent color is outside of the displayable gamut) in the blue safe mode. In the wear leveling mode, display control logic 434 may control to drive subpixel elements based on their respective wear levels and based on knowledge of color primaries (e.g., blue) that are known to wear faster than other color primaries, in order to improve color gamut and also to increase overall life of display device 430. In the colorblind mode, display control logic 434 may control to avoid color/frequencies that may be difficult to discriminate by a user or to which the user is sensitive. Above examples of various modes are illustrative and not-limiting. Mode setting unit 444 may also be configured to set display device 430 to other modes.

Optimization operation module 442 may include global optimization table 448 and scaling unit 450. For each of the plurality of modes of display device 430, optimization operation module 442 may include one or more luma equations that may be employed to determine an energy distribution between subpixel elements of the group of subpixel elements of each pixel of display screen hardware 432 with the enhanced subpixel geometry. A non-limiting example of a luma equation (e.g., the rec.709/sRGB Luma equation) is as follows:

$$Y'=0.2126R'+0.7152G'+0.0722B' \quad \text{Equation (1)}$$

In Equation (1), Y' is the non-linear luma which is an approximation for perceived brightness. Society of Motion Picture and Television Engineers (SMPTE) RP 177 describes how to synthesize RGB to CIEXYZ conversion matrix given the XYZ coordinates of each primary.

Based on the mode set by mode setting unit 444, optimization operation module 442 may perform an optimization operation (e.g., a matrix operation, parametric operation, and the like) based on a particular luma equation (see example Equation (1)) corresponding to the set mode. By performing the optimization operation based on the particular luma equation, optimization operation module 442 may be able to determine for a given pixel value in the (color matched and super-sampled) rendered source content, the one or more subpixel elements of the corresponding pixel on display screen hardware 432 with the enhanced subpixel geometry to be energized and a corresponding energy level (e.g., voltage value, subpixel element value in a range of values) of the subpixel element. For example, if the nominal pixel value of the rendered pixel is (1, 0, 0) for (R, G, B), the optimization operation based on the corresponding luma equation of a given mode may determine corresponding energy levels or values for subpixel elements for a pixel on display screen hardware 432. This energy distribution (or subpixel element values of the group of subpixel elements of a pixel) becomes the global solution (global optimization) for any pixel on display screen hardware 432 where the nominal pixel value of the rendered pixel of (1,0,0) for (R, G, B) is to be displayed (for a given mode).

Optimization operation module 442 may store this subpixel element energy distribution information for any input pixel value in the rendered source content as global optimization table 448 (global optimization). The information may be stored in global optimization table 448 in any suitable format. For example, for each subpixel element of the group of subpixel elements for a given input pixel value in the rendered source content, the energy distribution information may be stored as a value within a predetermined range of values (e.g., 0-255). In addition to determining the energy distribution (global solution) based on the characteristics of the particular mode and based on the information included in the subpixel geometry map 446, each of the plurality of luma equations may further account for one or more additional factors for determining the energy level for the subpixel elements for a given input pixel value of the source content. Non-limiting examples of the additional factors may include wear level of the subpixel elements, efficiency of the subpixel elements, avoiding patterns by energizing as many subpixel elements as possible, reducing metamarism by engaging all subpixel elements, engaging more subpixel elements to achieve greater precision than is afforded by nominal per-component quantization, and the like.

Optimization operation module 442 may also include scaling unit 450 for performing a non-uniform scaling operation from a Cartesian space corresponding to the super-sampled, rendered, and color matched source content to an "enhanced" space (display space) corresponding to the enhanced subpixel geometry of display screen hardware 432. Scaling unit 450 may perform a scaling (e.g., subsampling, downscaling, and the like) operation on the super-sampled content to a desired size (e.g., a resolution that matches the display resolution or native resolution of display screen hardware 432), using the extra rendered super-sampled pixels for calculation. For example, scaling unit 450 may perform a downscaling operation by averaging pixel values of a group of pixels in the super-sampled content that correspond to a single pixel of display screen hardware 432. The resultant downsampled content may be spatially antialiased with smoother transitions from one line of pixels to another along the edges of objects.

By applying global optimization table 448 to scaled content generated by scaling unit 450, optimization operation module 442 may generate and output in a display space, intermediate content 452 having a resolution that matches the display resolution of display screen hardware 432. For example, intermediate content 452 may include for each pixel of display screen hardware 432, output subpixel element values for each subpixel element of the pixel. Alternately, global optimization table 448 may be applied to the super-sampled, rendered, and color matched source content and the scaling operation may be performed on the resultant intermediate content.

Display control logic 434 may further include error minimization module 460 for performing an error minimization operation on intermediate content 452 for each of the subpixel elements of each pixel of display screen hardware 432 with the enhanced subpixel geometry, based on the super-sampled source content, the current set mode by mode setting unit 444, and the representation of the enhanced subpixel geometry from subpixel geometry map 446.

Error minimization module 460 may include one or more error functions 462 that optimize subpixel element values for each subpixel element in intermediate content 452, based on the current mode set by mode setting unit 444. In one embodiment, error functions 462 may include one or more error functions for each of the plurality of modes of display device 430. The error function 462 employed by error minimization module 460 on intermediate content 452 may then depend on the mode display device 430 is set in by mode setting unit 444. In one embodiment, the mode set by mode setting unit 444 to generate global optimization table 448 may be different from the mode set by mode setting unit 444 to select a particular error function 462 for performing the error minimization operation. In another embodiment, the mode for generating global optimization table 448 may be the same as the mode for selecting a particular error function 462 for performing the error minimization operation. The difference error minimized by error minimization module 460 is simply the desired super-sampled pixel buffer and the initial subpixel solution (global optimization; as described by the subpixel geometry at the same resolution). Error minimization module 460 may apply error diffusion or minimization techniques such as Floyd Steinberg error diffusion, optionally followed by noise shaping. Error function 462 may be tuned to limit specific types of concerns such as speckle, fine lines not appearing solid, straight, and the like. Noise shaping could be based on temporal stochastic noise causing inter-frame temporal differences (dither) to further reduce perceptual error.

In one embodiment, the error minimization operation may be an error diffusion operation such as Floyd Steinberg in which subpixel element values for each pixel in intermediate content 452 derived based on the global optimization table 448 are further optimized (e.g., adjusted) based on corresponding pixel values in the super-sampled source content. That is, in the error minimization operation, each subpixel element (and corresponding values in intermediate content 452) of each pixel having the enhanced subpixel geometry may be treated as a "pseudo-pixel." Error minimization module 460 may then, based on information (e.g., spatial, colorimetric, and the like) from subpixel geometry map 446, identify the rendering intent at that pseudo-pixel based on a value derived from one or more pixels in the super-sampled source content (rendered in color matched and extended range space) that correspond to the pseudo-pixel of display screen hardware 432. The rendering intent may then be compared to the actual submitted value for the pseudo-pixel in intermediate content 452. Based on the comparison of actual and intended values (and based on colorimetric data of the pseudo-pixel as obtained from subpixel geometry map 446), error minimization module 460 may track an error value in an extended range space and propagate the error forward. In this way, by propagating the error forward while performing the error minimization operation on the plurality of pseudo-pixels in intermediate content 452, error minimization module 460 adjusts subpixel element values in intermediate content 452 to perturb the initial solution based on global optimization table 448 to generate display content 470 in which subpixel element values (energy distribution) have been further optimized (for spatial correctness, color correctness, and the like, based on error function 462 employed). For example, if the value derived from the super-sampled source content indicates a white pixel, but the corresponding pseudo-pixel is only able to emit blue light, the error minimization operation may optimize subpixel element values of neighboring subpixel elements of the pseudo-pixel (e.g., increase red subpixel element value, decrease blue subpixel element value, and the like) to balance the energy distribution to get the best approximation of the intended color (e.g., white).

The error minimization operation may also result in getting the extra resolution included in super-sampled source content represented in display content 470 where values have been adjusted at the subpixel-level. By applying the global optimization via optimization operation module 442 and the error minimization via error minimization module 460, and while accounting for the representation of the subpixel geometry via subpixel geometry map 446 and the set mode via mode setting unit 444, display control logic 434 may optimally convolve the super-sampled, rendered, and color matched source content in the extended range space against the enhanced subpixel geometry of display screen hardware 432, yielding a subpixel-level antialiased result on the actual enhanced subpixel geometry and colorimetry of display screen hardware 432 in which spatial attributes, color, and dynamic range are optimally preserved as well as optimizing for power, brightness, low metamerism, or other attributes.

Depending on the error function 462 employed, different degree and/or types of error propagation may be employed by error minimization module 460 that results in different adjustments to the subpixel element values of intermediate content 452. Non-limiting examples of error functions 462 that may be employed include an error function for minimizing spatial error (i.e., maximum spatial coherence to super-sampled source content), an error function for minimizing color error, an error function to minimize power, and the like.

In one embodiment, the error minimization operation may be a single pass optimization operation. Alternately, the error minimization operation may be a multipass operation. The number of passes may be determined based on desired metrics such as processor usage, processing time, quality of source content, and the like. Further, processing performed by error minimization module may be selectively enabled based on predetermined conditions. For example, error minimization may be disabled when the display device is in the low power mode, when a relationship between dots per inch (DPI) of the display device and a viewing distance of the user meets a predetermined metric (e.g., presence detection), when a sensor detects a user to be farther than a particular distance from the display device, when acuity of the user is detected to be lower than a predetermined acuity, or when a quality of the display content is lower than a predetermined threshold (e.g., low contrast, low frequency, upscaled low-resolution content, and the like). Thus, when the system detects that the extra resolution provided by the error minimization operation is not important or is not perceptible by the user, the system may turn off the operation performed by error minimization module 460, and instead only rely on the mode-specific global solution provided by optimization operation module 442, thereby treating intermediate content 452 as display content 470 for display on display screen hardware 432.

Although in system architecture 400 in FIG. 4, the color matching operation, super-sampling, global optimization, and error minimization operations are performed by display control logic 434 in display device 430, hardware resources 418 on computing system 410 may be configured to perform these operations instead. For example, GPUs 422 and/or processors 420 could generate both intermediate content 452 and display content 470. Additionally or alternately, computing system 410 may include a dedicated chipset, firmware, and/or software that implements and manages one or more of the operations of display control logic 434.

Figure 5:
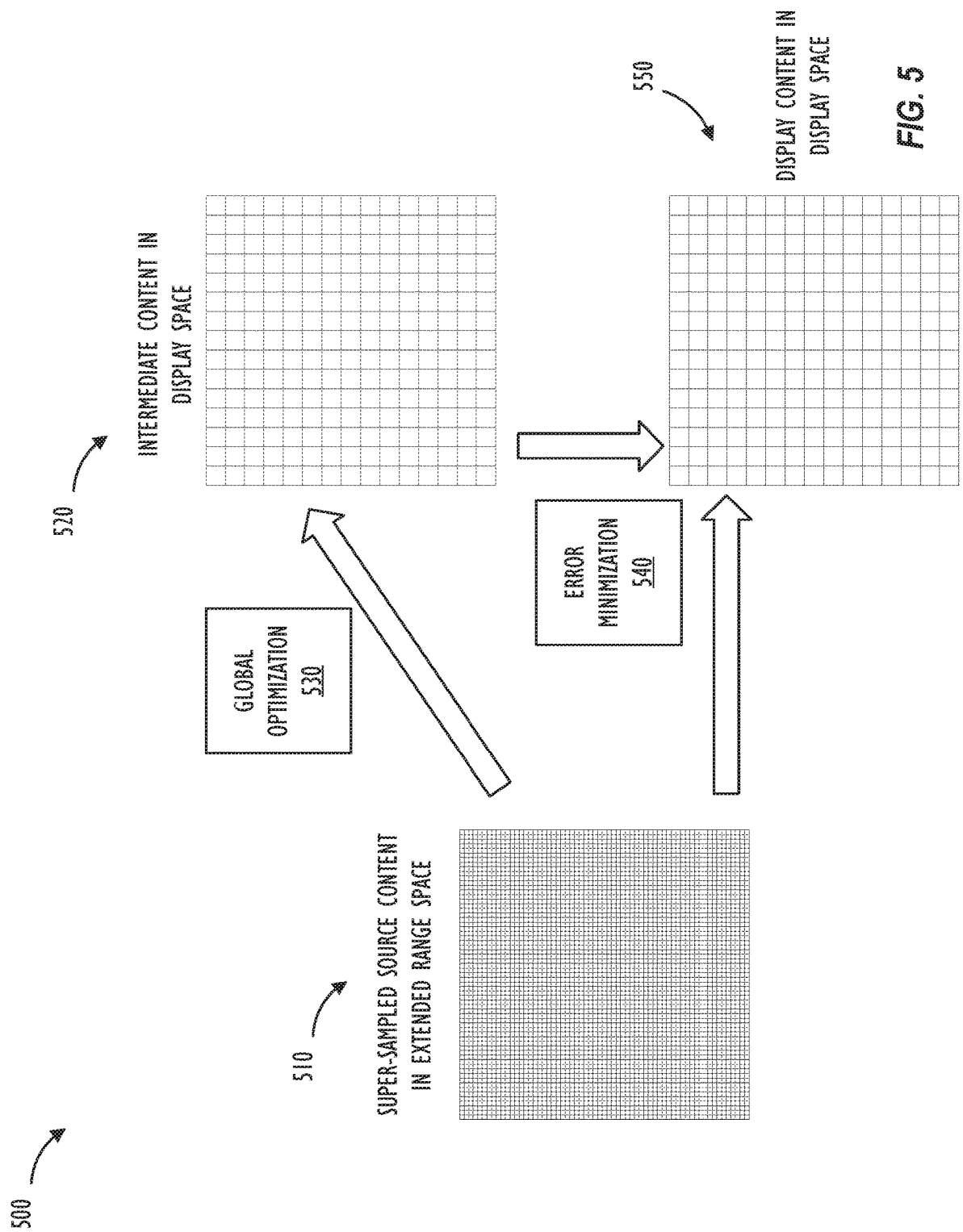
FIG. 5 illustrates a flow diagram of generating display content from super-sampled source content, in accordance with one or more embodiments.

FIG. 5 illustrates flow diagram 500 for generating display content from super-sampled source content, in accordance with one or more embodiments. As shown in FIG. 5, element 510 represents rendered, color matched, super-sampled source content that is rendered in the extended range space (e.g., pixel values outside nominal range of 0.0-1.0 carry extra gamut and dynamic range information). Thus, super-sampled source content 510 may not only be spatially super-sampled with high resolution information, but also carry "extended" gamut and dynamic range information per pixel. Element 520 represents intermediate content 452 in a display space (energy distribution for subpixel elements). A resolution of intermediate content 520 may be equal to a display resolution (e.g., native display resolution) of display screen hardware 432. Although not shown in FIG. 5, intermediate content 520 carries subpixel element values for each display pixel of display screen hardware 432 having the enhanced subpixel geometry. In the example shown in FIG. 5, a resolution of rendered content 510 is four times (4×) higher than the resolution of intermediate content 520.

Based on the mode in which display device 430 is set (e.g., low power mode), and based on the representation of the enhanced subpixel geometry in subpixel geometry map 446, optimization operation module 442 may derive global optimization table 448 (global optimization 530). Based on global optimization 530, optimization operation module 442 may, for each group of 4 pixels in content 510, obtain a pixel value (e.g., average pixel value of the 4 pixels), and convert the pixel value associated with content 510 into subpixel element values of a corresponding pixel in intermediate content 520. Thus, the subpixel element values in intermediate content 520 for the corresponding pixel may indicate the energy distribution for driving the corresponding subpixel elements on display screen hardware 432 to represent the pixel value associated with content 510. Any extended range space information in the pixel value associated with content 510 may also be represented in subpixel element values in intermediate content 520 and on display screen hardware 432.

Further, based on the mode display device 430 is set in (e.g., low power mode), and based on the representation of the enhanced subpixel geometry in subpixel geometry map 446, error minimization module 460 may perform an error minimization operation with a corresponding error function 462 (error minimization 540) on intermediate content 520 at a subpixel-level. As shown in FIG. 5, based on the extra spatial resolution represented in content 510, corresponding subpixel element values in intermediate content 520 may be further adjusted based on single pass or multipass minimization techniques (e.g., error diffusion) to perturb global optimization 530 at a subpixel-level, and generate display content 550. By embracing known enhanced subpixel geometry of display screen hardware 432 and generating super-sampled content 510, higher effective spatial resolution may be achieved in display content 550 while simultaneously achieving subpixel-level antialiasing effect on all content included in the frame and dynamically representing higher subpixel-level spatial frequencies. Further, color fringing or other artifacts caused by the enhanced subpixel geometry can be corrected in display content 550 due to error minimization operation. Since subpixel elements on display screen hardware 432 have higher spatial resolution than corresponding pixel elements, by rendering content 510 at a higher resolution (e.g., resolution equal to or higher than the subpixel element resolution), higher precision and spatial accuracy in placing content 510 on subpixel elements on display screen hardware 432 can be achieved by further optimizing subpixel element values from the initial global solution.

Figure 6:
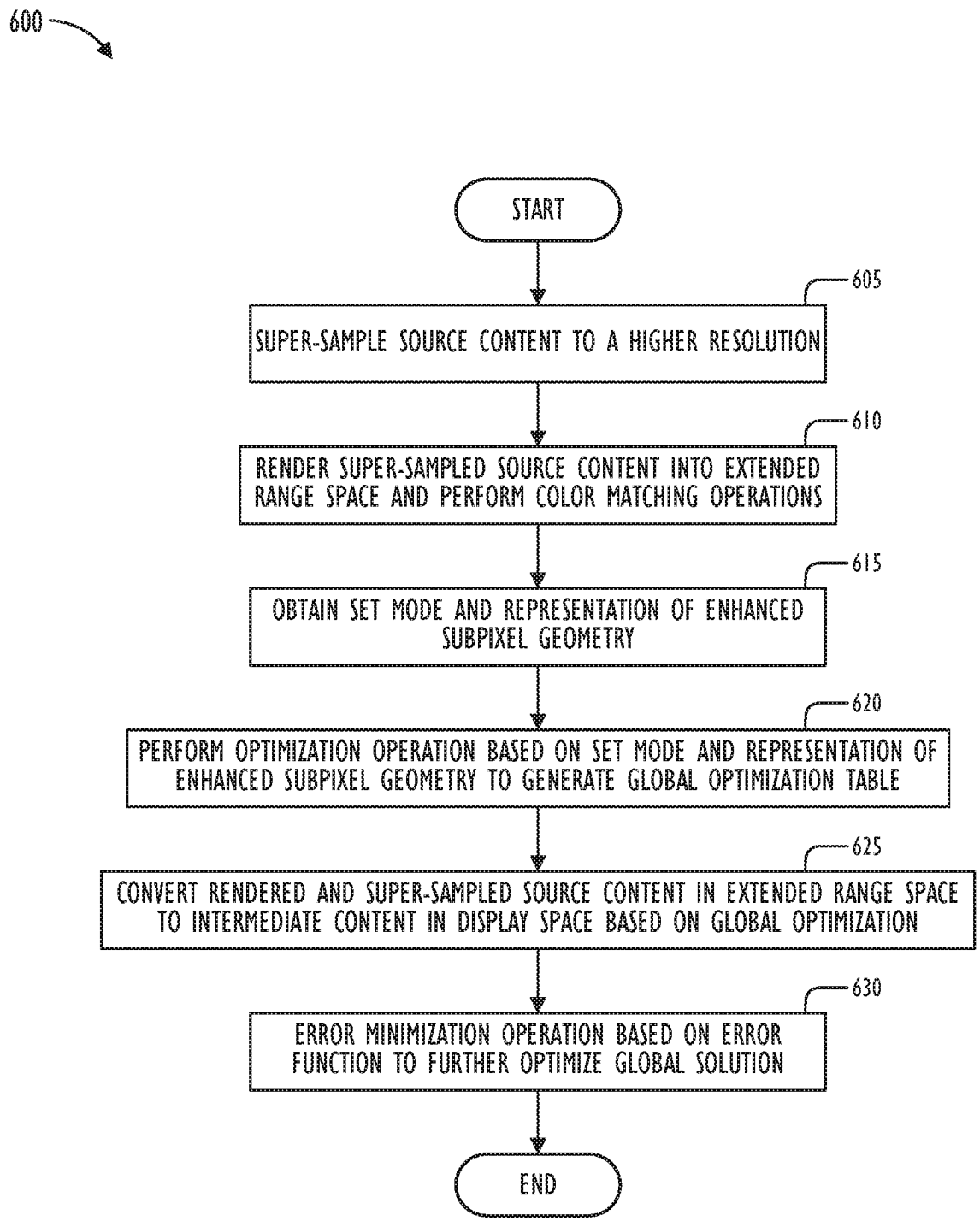
FIG. 6 illustrates, in flowchart form, a process for performing content rendering on enhanced subpixel geometry displays, in accordance with one or more embodiments.

FIG. 6 illustrates, in flowchart form, a process for performing content rendering on enhanced subpixel geometry displays, in accordance with one or more embodiments. Flowchart 600 begins at block 605 when computing system 410 creates source content 414 at a high resolution (e.g., resolution equal to or higher than the subpixel element resolution of display device 430) in an extended range space associated with the source color profile. At block 610, computing system 410 (or in combination with display control logic 434) renders the super-sampled, high resolution source content and performs color matching operations to perform a color-space conversion from the source color profile to the display color profile for the rendered source content. The rendered, high resolution source content is thus rendered in an extended range space associated with the display color profile.

At block 615, display control logic 434 may obtain a mode (e.g., low power mode, blue safe mode, maximum brightness mode, wear leveling mode, colorblind mode, and the like) display device 430 is set in by mode setting unit 444. Display control logic 434 at block 615 may further obtain the representation of enhanced subpixel geometry of display screen hardware 432 from subpixel geometry map 446. The representation (e.g., matrix of cells) may indicate the enhanced subpixel geometry of the display in repeating blocks (or non-repeating subpixel layout of the entire display overall), and corresponding subpixel element characteristics (e.g., spatial, colorimetric, performance, efficiency, spectral, dynamic range, and other characteristics). Based on the information obtained at block 615, optimization operation module 442 may perform optimization operation at block 620 based on a corresponding luma equation to derive an energy distribution (e.g., subpixel element values, energy levels, voltage levels, and the like) for displaying a given rendered pixel value on the display. The derived energy distribution information may be stored as global optimization table 448.

At block 625, optimization operation module 442 may utilize the global optimization table 448 generated at block 620 and subsample the high resolution source content to the enhanced subpixel geometry of the display device to generate intermediate content 452 in a display space. For each pixel of display screen hardware 432, intermediate content 452 may include corresponding subpixel element values (energy distribution) for driving display screen hardware 432. At block 630, error minimization module 460 may further optimize the global solution by adjusting the subpixel element values in intermediate content 452, based on an error minimization operation utilizing a particular error function. The error function may depend on the set mode of the display device. The error minimization may be a single pass or multipass error diffusion operation.

In one embodiment, display control logic 434 may smoothly animate transitions between the plurality of modes to which the display device may be set to avoid "pops" or other visual disturbances (e.g., highlights suddenly become 10× brighter by employing white subpixel elements), such that a transition from performing the global optimization 530 operation, and the error minimization 540 operation based on a previous set mode to performing the same operations based on the current set mode is carried out in multiple intermediate transition steps to avoid drawing unnecessary attention of the user. For example, display control logic 434 may achieve the smoothly animated transitions between modes by animating small steps to weightings in the initial 3-channel input to subpixel solution (global optimization 530) or in any error minimization step (single pass or multi pass error minimization 540).

Figure 7:
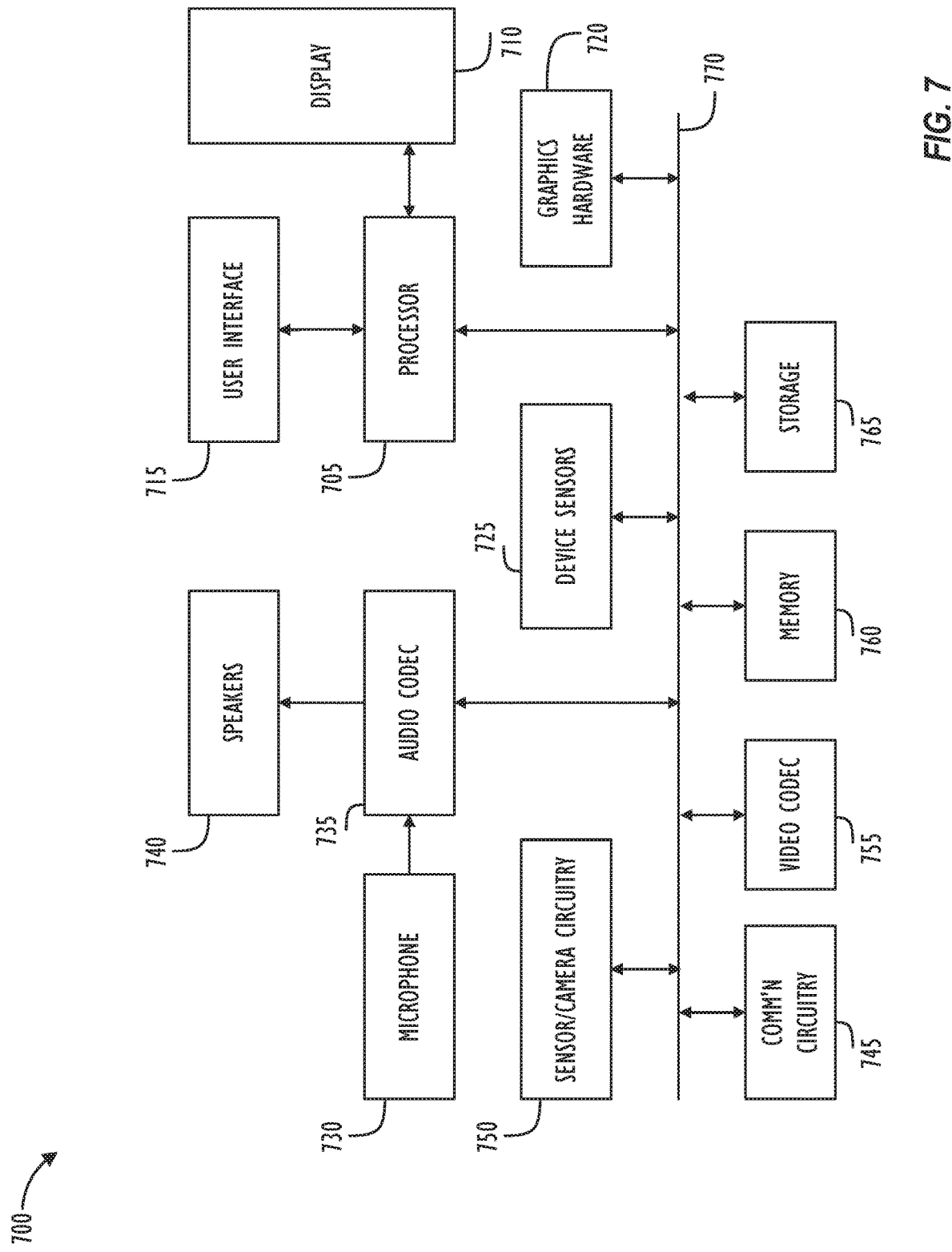
FIG. 7 is a simplified functional block diagram of an illustrative multi-functional electronic device.

Referring to FIG. 7, a simplified functional block diagram of illustrative device 700 that performs rendering, global optimization, and error minimization on enhanced subpixel geometry as described in FIGS. 4-6 is shown. Device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, sensor and camera circuitry 750, video codec(s) 755, memory 760, storage 765, and communications bus 770. Electronic device 700 may be, for example, a digital camera, a personal digital assistant (PDA), personal music player, mobile telephone, server, notebook, laptop, desktop, or tablet computer. More particularly, the disclosed techniques may be executed on a device that includes some or all of the components of device 700.

Processor 705 may execute instructions necessary to carry out or control the operation of many functions performed by a multi-functional electronic device 700 (e.g., such as global optimization and error minimization). Processor 705 may, for instance, drive display 710 and receive user input from user interface 715. User interface 715 can take a variety of forms, such as a button, keypad, dial, a click wheel, keyboard, display screen and/or a touch screen. Processor 705 may be a system-on-chip such as those found in mobile devices and include a dedicated graphics-processing unit (GPU). Processor 705 may represent multiple central processing units (CPUs) and may be based on reduced instruction-set computer (RISC) or complex instruction-set computer (CISC) architectures or any other suitable architecture and each may include one or more processing cores. Graphics hardware 720 may be special purpose computational hardware for processing graphics and/or assisting processor 705 process graphics information. In one embodiment, graphics hardware 720 may include one or more programmable graphics-processing unit (GPU), where each such unit has multiple cores.

Sensor and camera circuitry 750 may capture still and video images that may be processed to generate images in accordance with this disclosure. Sensor in sensor and camera circuitry 750 may capture raw image data as red, green, and blue (RGB) data that is processed to generate an image. Output from camera circuitry 750 may be processed, at least in part, by video codec(s) 755 and/or processor 705 and/or graphics hardware 720, and/or a dedicated image-processing unit incorporated within camera circuitry 750. Images so captured may be stored in memory 760 and/or storage 765. Memory 760 may include one or more different types of media used by processor 705, graphics hardware 720, and camera circuitry 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as compact disc-ROMs (CD-ROMs) and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705 such computer program code may implement one or more of the methods described herein.

As used herein, the term "computer system" or "computing system" refers to a single electronic computing device or to two or more electronic devices working together to perform the function described as being performed on or by the computing system. This includes, by way of example, a single laptop, host computer system, wearable electronic device, and/or mobile device (e.g., smartphone, tablet, and/or other smart device).

It is to be understood that the above description is intended to be illustrative, and not restrictive. The material has been presented to enable any person skilled in the art to make and use the claimed subject matter as described herein, and is provided in the context of particular embodiments, variations of which will be readily apparent to those skilled in the art (e.g., some of the disclosed embodiments may be used in combination with each other). In addition, some of the described operations may have their individual steps performed in an order different from, or in conjunction with other steps, than presented herein. More generally, if there is hardware support some operations described in conjunction with FIGS. 1, 4 and 7 may be performed in parallel.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by one or more programmable control devices and comprising instructions stored thereon to cause the one or more programmable control devices to:
    obtain source content from a rendering layer, wherein the source content is super-sampled to a first resolution in an extended range space;
    obtain a representation of a subpixel geometry of a display panel for displaying the source content, wherein the display panel includes, for every pixel, a plurality of subpixel elements respectively corresponding to three or more color primaries, and wherein a native resolution of the display panel is lower than the first resolution of the source content;
    perform an optimization operation based on a set mode of the display panel and based on the representation of the subpixel geometry to derive a global optimization for determining, for a given pixel value based on the source content, an energy distribution between the plurality of subpixel elements of a corresponding pixel of the display panel;
    convert the source content in the extended range space into intermediate content in a display space based on the global optimization; and
    perform, for a given error function and based on the representation of the subpixel geometry of the display panel, an error minimization operation on the intermediate content associated with each of the plurality of subpixel elements of each pixel of the display panel, based on the super-sampled source content in the extended range space.

2. The non-transitory program storage device of claim 1, wherein the subpixel elements of each pixel of the display panel include a red subpixel element, a green subpixel element, a blue subpixel element, and a white subpixel element.

3. The non-transitory program storage device of claim 1, wherein the subpixel elements of the display panel include at least four subpixel elements from among: one or more red subpixel elements, one or more green subpixel elements, one or more blue subpixel elements, one or more cyan subpixel elements, one or more magenta subpixel elements, one or more yellow subpixel elements, and a white subpixel element.

4. The non-transitory program storage device of claim 1, wherein, for each pixel of the display panel, a spatial dimension of a first one of the plurality of subpixel elements is different from a spatial dimension of a second one of the plurality of subpixel elements.

5. The non-transitory program storage device of claim 1, wherein the representation of the subpixel geometry of the display panel includes a matrix having a predetermined resolution that captures at least one of spectral characteristics, spatial characteristics, and performance characteristics, for each of the plurality of subpixel elements of each pixel of the display panel.

6. The non-transitory program storage device of claim 1, wherein the display panel has a non-repeating subpixel layout, and wherein the matrix representing the subpixel geometry captures the at least one of spectral characteristics, spatial characteristics, and performance characteristics for each subpixel element of the display panel with the non-repeating subpixel layout.

7. The non-transitory program storage device of claim 1, wherein the set mode is one of a plurality of modes of the display panel, and wherein the plurality of modes include a maximum brightness mode, a maximum gamut mode, a maximum resolution mode, a low power mode, a blue safe mode, a wear leveling mode, and a colorblind mode.

8. The non-transitory program storage device of claim 1, wherein the instructions that cause the one or more programmable control devices to perform an error minimization operation comprise instructions that cause the one or more programmable control devices to perform one of a single pass error diffusion operation and a multipass error diffusion operation.

9. The non-transitory program storage device of claim 1, wherein the instructions that cause the one or more programmable control devices to perform an error minimization operation comprise instructions that cause the one or more programmable control devices to perform the error minimization operation when a predetermined condition is satisfied.

10. The non-transitory program storage device of claim 9, wherein the predetermined condition is associated with at least one of the set mode of the display panel, a relationship between dots per inch (DPI) of the display device and a viewing distance of a user, and a quality of display content generated based on the intermediate content.

11. The non-transitory program storage device of claim 1, wherein the instructions further cause the one or more programmable control devices to:
set the mode of the display panel from a first mode to a second mode; and
smoothly animate a transition from performing the optimization operation and the error minimization operation based on the first mode to performing the optimization operation and the error minimization operation based on the second mode via a plurality of intermediate transition steps.

12. A method comprising:
obtaining source content from a rendering layer, wherein the source content is super-sampled to a first resolution in an extended range space;
obtaining a representation of a subpixel geometry of a display panel for displaying the source content, wherein the display panel includes, for every pixel, a plurality of subpixel elements respectively corresponding to three or more color primaries, and wherein a native resolution of the display panel is lower than the first resolution of the source content;
performing an optimization operation based on a set mode of the display panel and based on the representation of the subpixel geometry to derive a global optimization for determining, for a given pixel value based on the source content, an energy distribution between the plurality of subpixel elements of a corresponding pixel of the display panel;
converting the source content in the extended range space into intermediate content in a display space based on the global optimization; and
performing, for a given error function and based on the representation of the subpixel geometry of the display panel, an error minimization operation on the intermediate content associated with each of the plurality of subpixel elements of each pixel of the display panel, based on the super-sampled source content in the extended range space.

13. The method of claim 12, wherein the subpixel elements of the display panel include at least four subpixel elements from among: one or more red subpixel elements, one or more green subpixel elements, one or more blue subpixel elements, one or more cyan subpixel elements, one or more magenta subpixel elements, one or more yellow subpixel elements, and a white subpixel element.

14. The method of claim 12, wherein, for each pixel of the display panel, a spatial dimension of a first one of the plurality of subpixel elements is different from a spatial dimension of a second one of the plurality of subpixel elements.

15. The method of claim 12, wherein the representation of the subpixel geometry of the display panel includes a matrix having a predetermined resolution that captures at least one of spectral characteristics, spatial characteristics, and performance characteristics, for each of the plurality of subpixel elements of each pixel of the display panel.

16. The method of claim 12, wherein the set mode is one of a plurality of modes of the display panel, and wherein the plurality of modes include a maximum brightness mode, a maximum gamut mode, a maximum resolution mode, a low power mode, a blue safe mode, a wear leveling mode, and a colorblind mode.

17. The method of claim 12, wherein performing an error minimization operation comprises performing one of a single pass error diffusion operation and a multipass error diffusion operation.

18. The method of claim 12, wherein performing an error minimization operation comprises performing the error minimization operation when a predetermined condition is satisfied.

19. The method of claim 18, wherein the predetermined condition is associated with at least one of the set mode of the display panel, a relationship between DPI of the display device and a viewing distance of a user, and a quality of display content generated based on the intermediate content.

20. A system comprising:
a display panel;
memory; and
one or more processors operatively coupled to the memory and the display panel, wherein the memory comprises instructions that, when executed by the one or more processors, cause the one or more processors to:
obtain source content from a rendering layer, wherein the source content is super-sampled to a first resolution in an extended range space;
obtain a representation of a subpixel geometry of the display panel for displaying the source content, wherein the display panel includes, for every pixel, a plurality of subpixel elements respectively corresponding to three or more color primaries, and wherein a native resolution of the display panel is lower than the first resolution of the source content;

perform an optimization operation based on a set mode of the display panel and based on the representation of the subpixel geometry to derive a global optimization for determining, for a given pixel value based on the source content, an energy distribution between the plurality of subpixel elements of a corresponding pixel of the display panel;

convert the source content in the extended range space into intermediate content in a display space based on the global optimization; and perform, for a given error function and based on the representation of the subpixel geometry of the display panel, an error minimization operation on the intermediate content associated with each of the plurality of subpixel elements of each pixel of the display panel, based on the super-sampled source content in the extended range space.

* * * * *